United States Patent [19]

Huang

[11] Patent Number: 5,718,051

[45] Date of Patent: Feb. 17, 1998

[54] PIPE CUTTER HAVING AN ADJUSTABLE MOVING STROKE

[76] Inventor: Chi-Chieh Huang, No. 9, Alley 38, Lane 301, Nan Yang Road, Feng Yuan City., Taichung Hsien, Taiwan

[21] Appl. No.: 781,344

[22] Filed: Jan. 21, 1997

[51] Int. Cl.$^6$ .................................................. B26B 13/00
[52] U.S. Cl. ...................................... 30/250; 30/92
[58] Field of Search ........................... 30/250, 92, 251, 30/192; 81/314

[56] References Cited

U.S. PATENT DOCUMENTS

| | | | |
|---|---|---|---|
| 4,779,342 | 10/1988 | Kobayashi et al. | 30/250 |
| 5,184,404 | 2/1993 | Chen | 30/250 |
| 5,218,768 | 6/1993 | Putsch et al. | 30/250 |
| 5,526,570 | 6/1996 | Beetz et al. | 30/250 |

Primary Examiner—Hwei-Siu Payer
Attorney, Agent, or Firm—Charles E. Baxley, Esq.

[57] ABSTRACT

A pipe cutter includes a jaw formed on one end of a handle and includes a cutter blade pivotally coupled to the handle and having a cutter edge adapted to be moved toward the jaw for cutting a pipe. The cutter blade includes a number of ratchet teeth formed in the bottom peripheral portion and includes a depression having two end portions. A handgrip includes an actuator for engaging with the ratchet teeth and for rotating the cutter blade. A pawl may prevente the cutter blade from rotating in the reverse direction. An adjusting member is pivotally coupled to the handle and includes a protrusion slidably engaging with the depression of the cutter blade and engageable with either of the end portions of the depression for adjusting the distance between the cutter edge and the jaw.

7 Claims, 4 Drawing Sheets

PIPE CUTTER HAVING AN ADJUSTABLE MOVING STROKE

BACKGROUND OF THE INVENTION

1. Field of the Invention

The present invention relates to a pipe cutter, and more particularly to a pipe cutter having an adjustable moving stroke.

2. Description of the Prior Art

Typical pipe cutters comprise a pair of handles including a pair of cutting blades provided on one end and movable toward each other for cutting a pipe or tubular member. In one type of the pipe cutters, the cutting blades may be moved toward each other step by step or gradually. However, the moving stroke of the cutting blades may not be adjusted, such that the cutting blades should also be moved for a large distance while cutting a pipe of smaller diameter.

The present invention has arisen to mitigate and/or obviate the afore-described disadvantages of the conventional pipe cutters.

SUMMARY OF THE INVENTION

The primary objective of the present invention is to provide a pipe cutter including a cutting jaw that may be adjusted to different moving stroke for cutting pipes of different diameter.

In accordance with one aspect of the invention, there is provided a pipe cutter comprising a body including a first end having a handle and including a second end having a jaw for engaging with a pipe to be cut, a cutter blade pivotally coupled to the body at a spindle and adapted to rotate in an active direction and a reverse direction, the cutter blade including a cutter edge adapted to be moved toward the jaw of the body for cutting the pipe, the cutter blade including a bottom peripheral portion having a plurality of ratchet teeth, the cutter blade including a depression having a first and a second end portions, a handgrip pivotally coupled to the body for allowing the handgrip to be moved toward and away from the handle, the handgrip including an actuator for engaging with the ratchet teeth of the cutter blade and for allowing the handgrip to rotate the cutter blade when the handgrip is moved toward the handle, means for engaging with the ratchet teeth of the cutter blade and for allowing the cutter blade to rotate in the active direction and for preventing the cutter blade to rotate in the reverse direction, an adjusting member pivotally coupled to the body at a pivot axle and including a protrusion for slidably engaging with the depression of the cutter blade, the protrusion being adapted to engage with either of the first and the second end portions of the depression, and means for maintaining the protrusion in either of the first and the second end portions of the depression. The cutter edge is spaced away from the jaw at a greater distance for cutting the pipe of greater diameter when the protrusion is engaged with the first end portion of the depression, and the cutter edge is spaced away from the jaw at a shorter distance when the protrusion is engaged with the second end portion of the depression for cutting the pipe of smaller diameter.

The body includes a stop for engaging with the handgrip and for limiting a rotational movement of the handgrip relative to the body.

The actuator is pivotally coupled to the handgrip, the handgrip includes a biasing means for biasing the actuator to engage with the ratchet teeth of the cutter blade.

The actuator includes a projection, the handgrip further includes a follower for engaging with the handle and having a first end pivotally coupled to the handgrip and having a second end, the second end of the follower includes an oblong hole for engaging with the projection of the actuator for allowing the follower to disengage the actuator from the ratchet teeth of the cutter blade when the follower is engaged with and rotated by the handle and when the handgrip is moved toward and to engage with the handle.

The means for engaging with the ratchet teeth of the cutter blade includes a biasing means for biasing the cutter blade to rotate in the reverse direction and for disengaging the cutter edge from the jaw, a pawl pivotally coupled to the body at a pivot pin and including an extension for engaging with the ratchet teeth and for preventing the cutter blade from rotating in the reverse direction.

The pawl includes a knob for disengaging the extension from the ratchet teeth of the cutter blade.

The body includes a curved slot for engaging with the protrusion of the adjusting member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
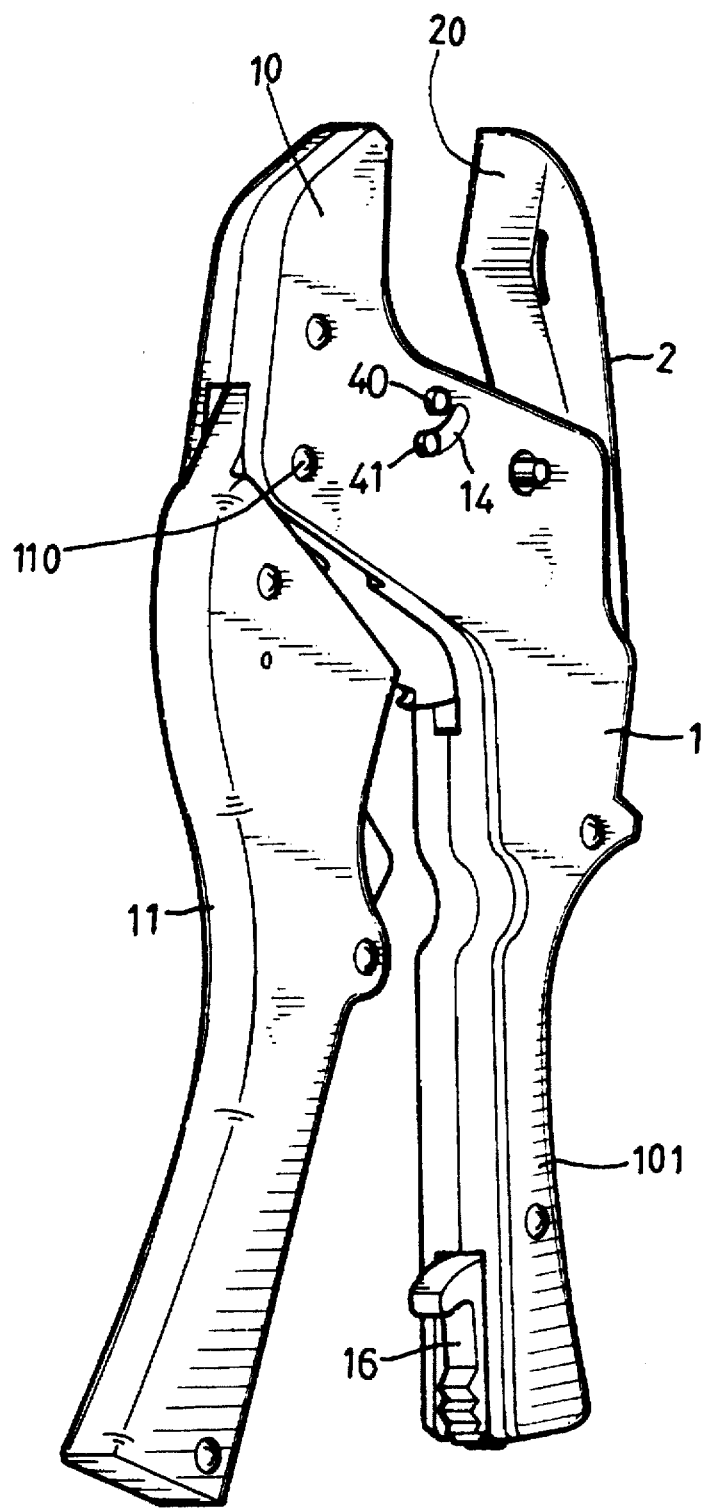
FIG. 1 is a perspective, view of a pipe cutter in accordance with the present invention.
Figure 2:
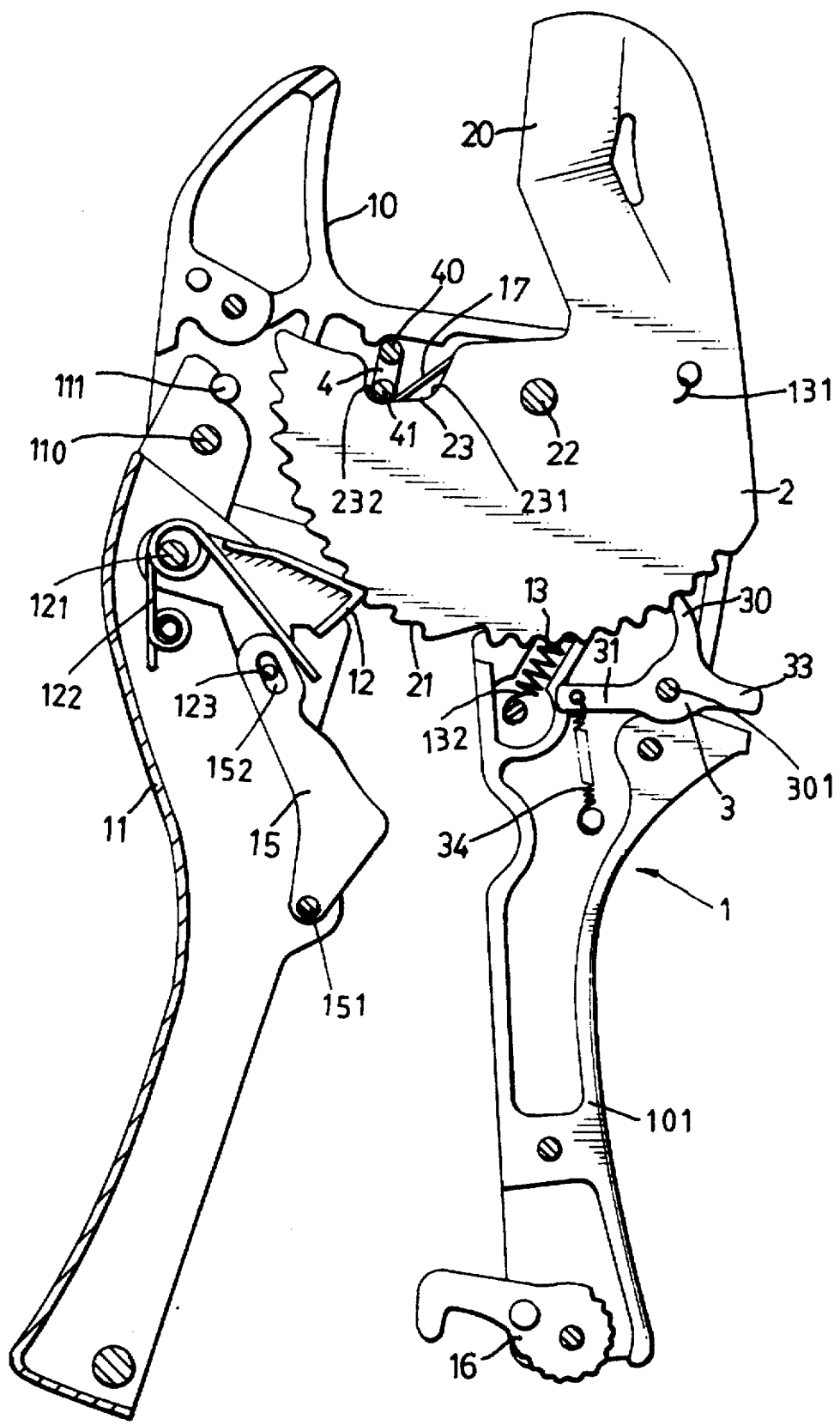
FIGS. 2, 3 and 4 are partial cross sectional views illustrating the operation of the pipe cutter.
Figure 4:
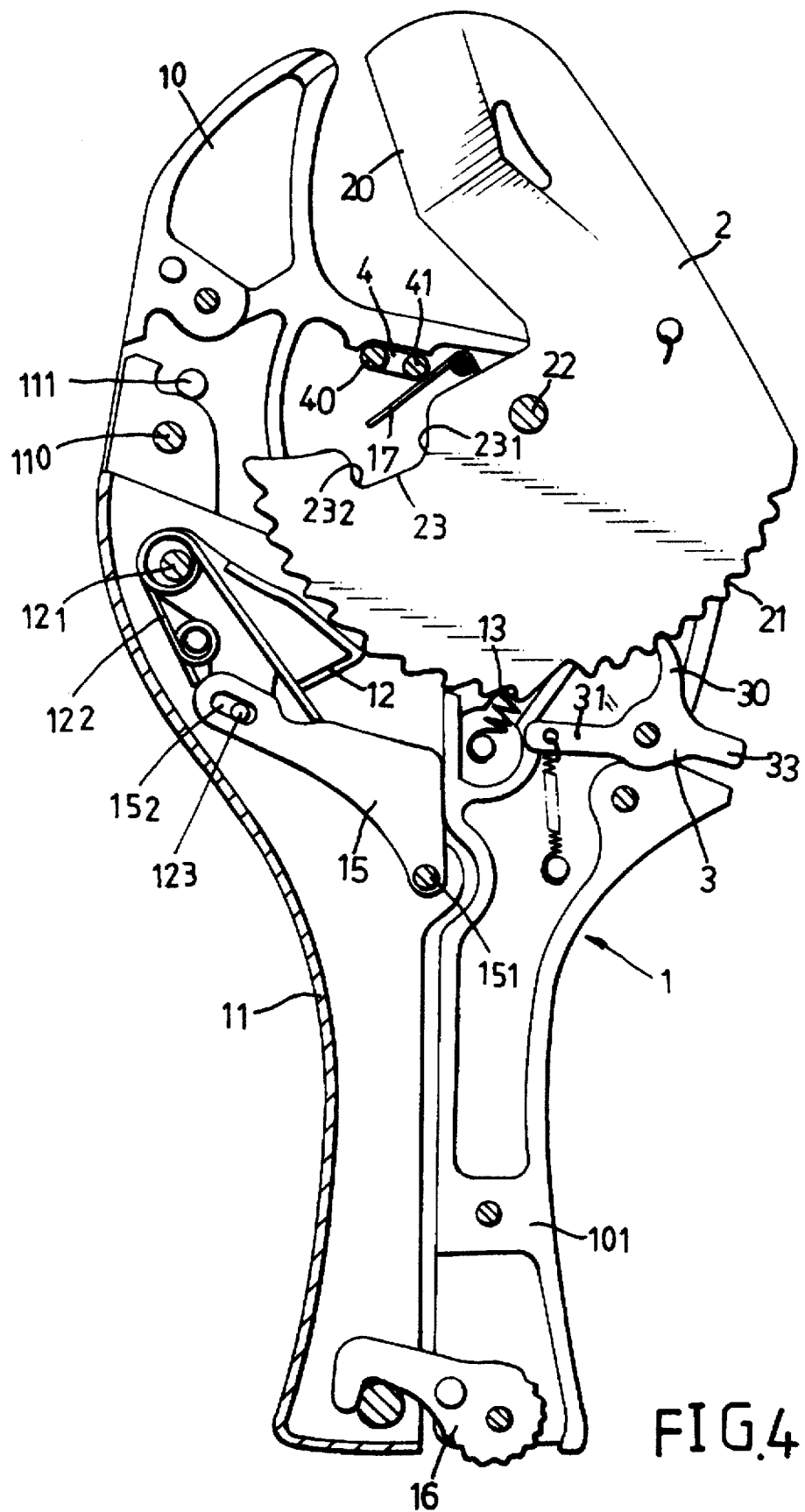

Referring to the drawings, and initially to FIGS. 1 and 2, a pipe cutter in accordance with the present invention comprises a body 1 including a handle 101 provided on one end and including a jaw 10 provided on the other end for engaging with a pipe to be cut. A handgrip 11 is pivotally coupled to the middle portion of the body 1 at a pivot shaft 110 for allowing the handgrip 11 to be moved toward or away from the handle 101 of the body 1. A hook 16 allows the handle 101 to be retained to the handgrip 11 as best seen in FIG. 4. The body 1 includes a stop 111 for engaging with the upper end of the handgrip 11 and for limiting a rotational movement of the handgrip 11 about the pivot shaft 110.

A cutter blade 2 is pivotally coupled to the body 1 at a spindle 22 for allowing the cutter blade 2 to be rotated about the spindle, and includes a cutter edge 20 movable toward the jaw 10 for cutting the pipe. A spring 13 includes one end 131 secured to the cutter blade 2 and includes the other end 132 secured to the body 1 for rotating the cutter blade 2 clockwise about the spindle 22 and for disengaging the cutter edge 20 from the jaw 10. The cutter blade 2 includes a number of ratchet teeth 21 formed in the bottom peripheral portion. A pawl 3 is pivotally coupled to the body 1 at a pivot pin 301 and includes an extension 30 for engaging with the ratchet teeth 21 of the cutter blade 2 and for preventing the cutter blade 2 from rotating backward and clockwise. The pawl 3 includes a projection 31 resiliently coupled to the body 1 by a spring 34 which may bias the extension 30 to engage with the ratchet teeth 21 of the cutter blade 2. The pawl 3 includes a knob 33 for disengaging the extension 30 from the ratchet teeth 21 of the cutter blade 2.

An actuator 12 is pivotally coupled to the handgrip 11 at a pivot pin 121, and a spring 122 may bias the actuator 12 to engage with the teeth 21 of the cutter blade 2 for allowing the handgrip 11 to rotate the cutter blade 2 when the handgrip 11 is moved toward the handle 101 of the body 1. The extension 30 of the pawl 3 may engage with the teeth 21 and may prevent the cutter blade 2 from rotating backward and clockwise when handgrip 11 is moved away from the handle 101 and when the actuator 12 is slided relative to the cutter blade 2 and to engage with the other ratchet teeth 21. The cutter edge 20 may thus be caused to move toward the jaw 10 step by step when the handgrip 11 is moved toward the handle 101 in a reciprocating action. A follower 15 has one end pivotally coupled to the handgrip 11 at a pin 151 and includes an oblong hole 152 formed in the other end for engaging with a projection 123 which is extended from the actuator 12 for allowing the follower 15 to disengage the actuator 12 from the teeth 21 of the cutter blade 2 when the follower 15 is rotated by the handle 101 and when the handgrip 11 is moved toward and moved to engage with the handle 101 (FIG. 4).

Figure 3:
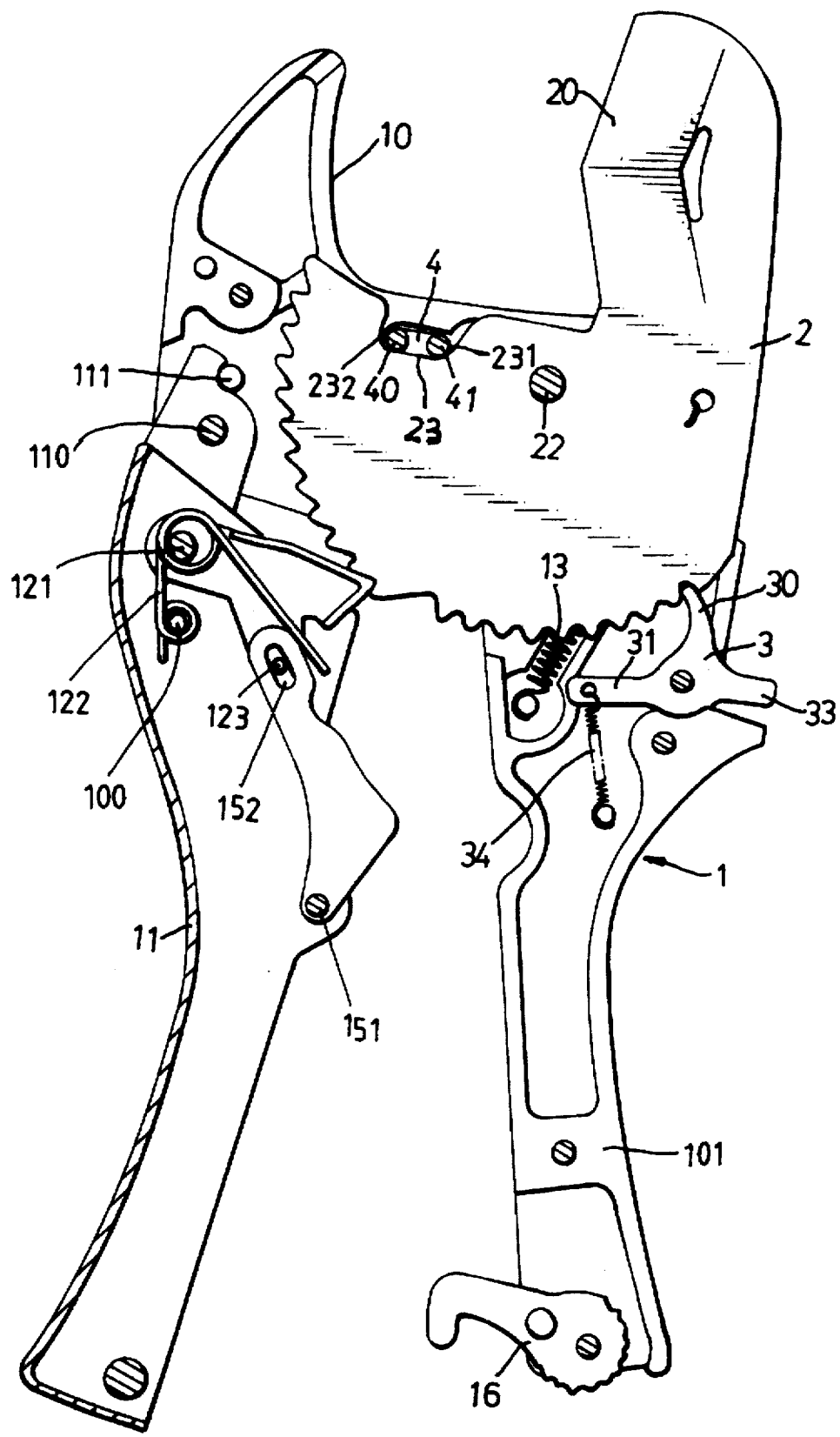

As best shown in FIGS. 1 to 3, the body 1 includes a curved slot 14 formed in the upper middle portion. An adjusting member 4 is pivotally coupled to the body 1 at a pivot axle 40 and includes a protrusion 41 slidably engaged in the curved slot 14 and movable from one end to the other of the curved slot 14. A spring 17 may bias against the adjusting member 4 for maintaining the protrusion 41 at either of the two ends of the curved slot 14. The cutter blade 2 includes a depression 23 having two end portions 231, 232 for engaging with the protrusion 41. As shown in FIG. 3, when the protrusion 41 is engaged in one end 231 of the depression 23, the cutter edge 20 is spaced away from the jaw 10 at a greater distance for allowing the pipe cutter to cut the pipe having greater diameter. However, as shown in FIGS. 1 and 2, when the protrusion 41 is engaged in the other end 232 of the depression 23, the cutter edge 20 is spaced away from the jaw 10 at a shorter distance for allowing the pipe cutter to cut pipes of smaller diameter and for allowing the cutter edge 20 to move in a shorter moving stroke.

Accordingly, the pipe cutter in accordance with the present invention includes a cutter edge 20 that may be adjusted to different distances from the fixed jaw 10 of the body 1 for allowing the pipe cutter to cut pipes of different diameter with suitable moving strokes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pipe cutter comprising:

a body including a first end having a handle and including a second end having a jaw for engaging with a pipe to be cut, a cutter blade pivotally coupled to said body at a spindle and adapted to rotate in an active direction and a reverse direction, said cutter blade including a cutter edge adapted to be moved toward said jaw of said body for cutting the pipe, said cutter blade including a bottom peripheral portion having a plurality of ratchet teeth, said cutter blade including a depression having a first and a second end portions, a handgrip pivotally coupled to said body for allowing said handgrip to be moved toward and away from said handle, said handgrip including an actuator for engaging with said ratchet teeth of said cutter blade and for allowing said handgrip to rotate said cutter blade when said handgrip is moved toward said handle, means for engaging with said ratchet teeth of said cutter blade and for allowing said cutter blade to rotate in said active direction and for preventing said cutter blade to rotate in said reverse direction, an adjusting member pivotally coupled to said body at a pivot axle and including a protrusion for slidably engaging with said depression of said cutter blade, said protrusion being adapted to engage with either of said first and said second end portions of said depression, and means for maintaining said protrusion in either of said first and said second end portions of said depression, said cutter edge being spaced away from said jaw at a greater distance for cutting the pipe of greater diameter when said protrusion is engaged with said first end portion of said depression, and said cutter edge being spaced away from said jaw at a shorter distance when said protrusion is engaged with said second end portion of said depression for cutting the pipe of smaller diameter.

2. A pipe cutter according to claim 1, wherein said body includes a stop for engaging with said handgrip and for limiting a rotational movement of said handgrip relative to said body.

3. A pipe cutter according to claim 1, wherein said actuator is pivotally coupled to said handgrip, said handgrip includes a biasing means for biasing said actuator to engage with said ratchet teeth of said cutter blade.

4. A pipe cutter according to claim 3, wherein said actuator includes a projection, said handgrip further includes a follower for engaging with said handle and having a first end pivotally coupled to said handgrip and having a second end, said second end of said follower includes an oblong hole for engaging with said projection of said actuator for allowing said follower to disengage said actuator from said ratchet teeth of said cutter blade when said follower is engaged with and rotated by said handle and when said handgrip is moved toward and to engage with said handle.

5. A pipe cutter according to claim 1, wherein said means for engaging with said ratchet teeth of said cutter blade includes a biasing means for biasing said cutter blade to rotate in said reverse direction and for disengaging said cutter edge from said jaw, a pawl pivotally coupled to said body at a pivot pin and including an extension for engaging with said ratchet teeth and for preventing said cutter blade from rotating in said reverse direction.

6. A pipe cutter according to claim 5, wherein said pawl includes a knob for disengaging said extension from said ratchet teeth of said cutter blade.

7. A pipe cutter according to claim 1, wherein said body includes a curved slot for engaging with said protrusion of said adjusting member.

* * * * *